May 31, 1932.   S. L. WILLIAMS   1,860,401
INERTIA BRAKE DEVICE
Filed Sept. 22, 1930   2 Sheets-Sheet 1
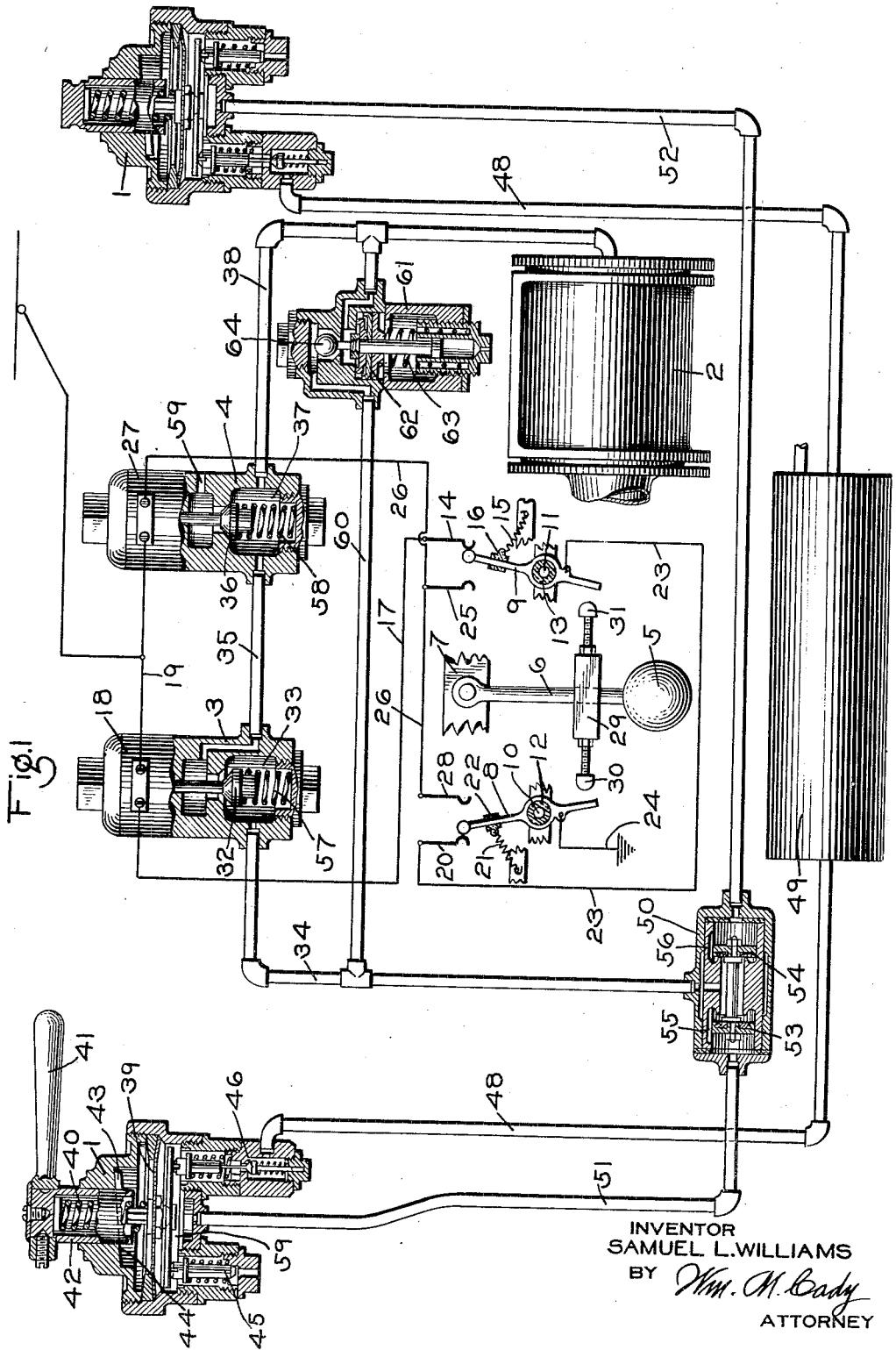
INVENTOR
SAMUEL L. WILLIAMS
BY   *Wm. M. Cady*
ATTORNEY

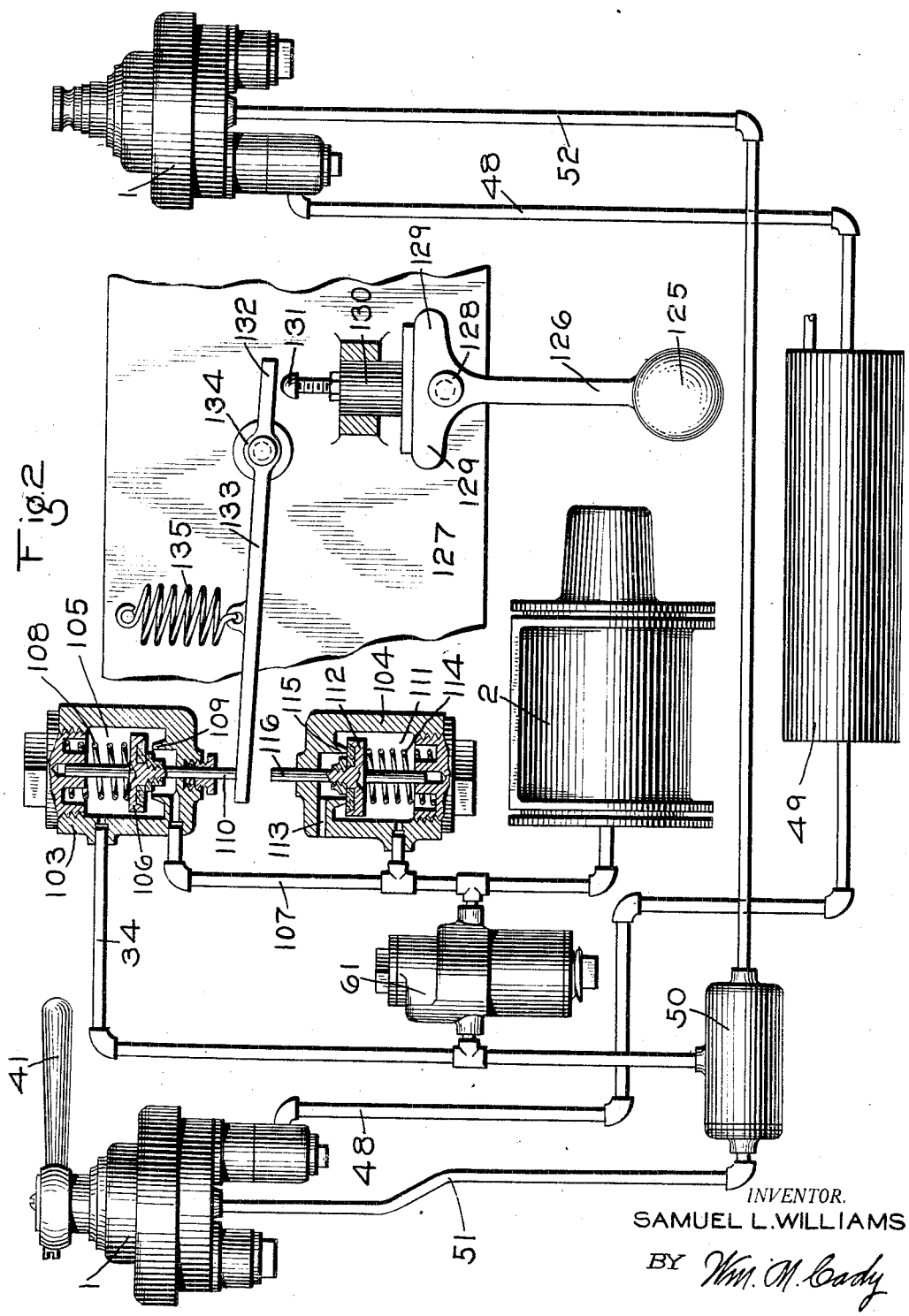

Patented May 31, 1932

1,860,401

UNITED STATES PATENT OFFICE

SAMUEL L. WILLIAMS, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA

INERTIA BRAKE DEVICE

Application filed September 22, 1930. Serial No. 483,479.

This invention relates to brakes and has for its principal object to provide means for regulating the rate of deceleration of a vehicle when the brakes are applied by varying the intensity with which the brakes are applied.

According to the present invention, improved means are provided for regulating the braking pressure according to the varying conditions or speed of the vehicle. The invention comprises the combining of suitable valve mechanism adapted to control both the supply and the release of fluid under pressure to a brake cylinder with inertia governing mechanism, so that the braking pressure may be regulated or reduced whenever the rate of retardation of the vehicle is excessive. The valve mechanism is so connected up with the inertia governing mechanism, that when the speed of the vehicle is suddenly reduced, the valve mechanism is operated by the inertia governing mechanism to automatically effect a reduction in braking pressure. According to one form of the invention, the valve mechanism may be electrically controlled, and in another form of the invention the valve mechanism is mechanically operated.

In the accompanying drawings; Figure 1 is a diagrammatic view, partly in section, showing one form of vehicle brake equipment embodying the invention, in which the valve mechanism is electrically controlled; and Fig. 2 is a view similar to Fig. 1, showing a modified form of valve mechanism.

Referring to Fig. 1, the equipment may comprise at each end of the car a brake valve device 1, for controlling the admission and release of fluid under pressure to and from a brake cylinder 2.

The equipment also comprises a magnet valve device 3 for controlling communication through which fluid is supplied to the brake cylinder, and a magnet valve device 4 for controlling the release of fluid from the brake cylinder.

The circuits of the magnet valve devices are controlled by an inertia device which may comprise a weight 5 having a supporting rod 6 pivotally mounted on a portion 7 of the vehicle framing. Contact arms 8 and 9 are pivotally mounted on the vehicle framing, the respective pivot pins 10 and 11 being insulated from the arms 8 and 9 by sleeves 12 and 13 of insulating material.

The arm 9 is normally held in contact with a contact member 14 by a spring 15 secured to a sleeve 16 of insulating material carried by the arm 9. The contact member 14 is connected to a wire 17 leading to one terminal of magnet 18, the other terminal of which is connected to a current supply wire 19.

The arm 8 is normally held in contact with a contact member 20 by a spring 21, secured to a sleeve 22 of insulating material carried by the arm 8. The contact member 20 is connected to a wire 23 which in turn is connected to the arm 9. The arm 8 is connected to ground at 24.

The arm 9 is adapted to engage a contact member 25 when said arm is rotated in a counter-clockwise direction, and contact member 25 is connected to a wire 26 leading to one terminal of magnet 27, the other terminal of said magnet being connected to the current supply wire 19. When arm 8 is rotated in a clockwise direction, it is adapted to engage a contact member 28, which is also connected to wire 26.

The rod 6 carrying the weight 5 carries a cross arm 29 provided with adjustable heads 30 and 31, said heads being adapted to engage the arms 8 and 9 respectively, when the weight 5 is swung to the left or to the right.

The magnet valve device 3 comprises a magnet 18 and a valve 32 adapted to be operated by said magnet. The valve 32 is contained in a valve chamber 33 which is connected to pipe 34 and said valve controls communication from valve chamber 33 to a pipe 35.

The magnet valve device 4 comprises a magnet 27 and a valve 36 adapted to be operated by said magnet. The valve 36 is contained in a valve chamber 37 which is connected to pipe 35, said valve chamber being also connected to pipe 38, leading to the brake cylinder 2.

Each brake valve device 1 may be of the self lapping type comprising a casing containing a flexible diaphragm 39, subject to the pressure of a coil spring 40. The spring 40 is compressed to apply pressure to the diaphragm by the rotation of a handlle 41, said handle being connected to a sleeve 42 which carries a lug 43 adapted to engage a cam face 44 in the casing.

The diaphragm 39 is adapted to operate a release valve 45 and a fluid pressure supply valve 46. The valve chamber 47 containing the valve 46 is connected to a pipe 48 leading to the main reservoir 49.

A double check valve device 50 controls communication from the brake valve supply pipes 51 and 52 to pipe 34 and comprises a casing containing a double check valve having heads 53 and 54.

The brake valve device at the non-operating end of the car is left in application position, so that the supply valve 46 is held unseated as shown in the brake valve device at the right of Fig. 1 of the drawing, so that fluid under pressure is supplied through pipe 52 to the double check valve head 54. Said head is thereby shifted to a seat, while the head 53 is in a position establishing communication from pipe 51, through a groove 55, to the chamber intermediate the heads, which chamber is connected to pipe 34.

It will be noted that with the parts positioned as shown in Fig. 1, the magnet 18 is energized by current flowing from the supply wire 19 through magnet 18 to wire 17 and thence through contact member 14 and arm 9 to wire 23. Wire 23 is connected to ground at 24 through contact member 20 and arm 8, so that the circuit through magnet 18 is closed, and the magnet being thus energized, the valve 32 is held unseated against the pressure of spring 57.

The release magnet 27 is normally deenergized, since neither contact member 28 or 25 is connected to the corresponding arm 8 or 9. With magnet 27 deenergized, the spring 58 holds the valve 36 seated.

In order to effect an application of the brakes and assuming that the brake valve device at the left is the operative brake valve, the handle 41 is rotated so that the spring 40 exerts pressure on diaphragm 39. The diaphragm is then deflected so as to close the exhaust valve 45 and unseat the supply valve 46. Fluid under pressure is then supplied from main reservoir pipe 48 to chamber 59 and thence flows through pipe 51 and around the double check valve head 53, through groove 55 to pipe 34.

From pipe 34, fluid under pressure flows past the open valve 32 to pipe 35 and thence through valve chamber 37 to pipe 38 and to the brake cylinder 2. Fluid is thus supplied to the brake cylinder to effect an application of the brakes.

If the rate of deceleration of the vehicle, due to the brakes having been applied exceeds the desired maximum rate, the adjustment and proportioning of the parts is such that the weight 5 will be moved in the direction of travel of the vehicle by its inertia, so as to cause one or the other of the heads 30 or 31 to engage the corresponding arms 8 or 9. If the vehicle is moving toward the left, then the head 30 will engage the arm 8 and will operate the arm so as to open the circuit at the contact member 20.

The circuit of magnet 18 will thus be opened, so that said magnet will be deenergized, permitting the spring 57 to seat the valve 32. Further flow of fluid to the brake cylinder will thus be cut off.

If the rate of deceleration increases, the weight 5 will swing further toward the left, operating the arm 8, so that it engages the contact member 28. A circuit is then closed through the magnet 27, so that said magnet is energized to effect the opening of valve 36.

Fluid under pressure is then vented from the brake cylinder 2 by way of the atmospheric exhaust port 59 and the pressure with which the brake shoes are applied to the wheels is relieved until the rate of deceleration is reduced so as to permit the weight 5 to move toward the right and thus cause the arm 8 to move, so that the circuit is opened at the contact member 28. The magnet 27 is then deenergized, permitting the valve 36 to be seated by the spring 58. The further release of fluid from the brake cylinder 2 is then cut off.

If the rate of deceleration should again exceed the desired maximum, the weight 5 will be moved toward the right, so as to again close the circuit of the release magnet through the contact member 28. Thus the rate of deceleration of the vehicle will be regulated throughout the period in which the vehicle is being brought to a stop.

If the vehicle is traveling in the opposite direction, the weight 5 will move toward the right when the rate of acceleration becomes excessive, and the arm 9 will be operated to open the circuit of magnet 18 at contact member 14, and close the circuit of the release magnet, upon further movement, at contact member 25, so that the operation will be the same as hereinbefore described, when the vehicle is moving toward the left.

In order to provide against possible failure of the above described apparatus, such as in the event the magnet 18 should remain deenergized, so that fluid under pressure could not be supplied to the brake cylinder by way of the magnet valve device 3, a by-pass pipe 60 may be provided, which directly connects pipe 34 with pipe 38, so that fluid under pressure can be supplied by operation of the brake valve device directly to the brake cylinder. In the pipe 60 is interposed a pressure limiting valve device comprising a casing 61 containing a piston 62, subject to the pressure of an adjustable spring 63.

The piston 62 is adapted to control the operation of a ball valve 64, which valve controls communication from pipe 60 to pipe 38.

When the brake cylinder pressure has been increased to a predetermined degree sufficient to overcome the opposing pressure of the spring 63, the piston will be moved downwardly, so that the valve 64 is permitted to seat and thus cut off the further flow of fluid to the brake cylinder.

A certain amount of free travel may be provided before the heads 30 and 31 engage the respective arms 8 and 9, so that the switch arms will not be operated as the weight 5 swings from its vertical position on grades, the free travel also permitting slight accidental movements of the weight due to various causes, without operating the switch arms.

The heads 30 and 31 are also made adjustable, so that the rate of deceleration at which the apparatus will be effective, may be adjusted as desired.

According to the form of the invention shown in Fig. 2, the equipment may be provided with a valve device 103 for controlling communication through which fluid is supplied to the brake cylinder 2, and a valve device 104 for controlling the release of fluid from the brake cylinder.

The valve device 103 may comprise a casing having a chamber 105 connected to the pipe 34 and containing a valve 106 for controlling communication from the chamber 105 to a pipe 107, leading to the brake cylinder 2. On one side the valve 106 is subject to the pressure of an expansible coil spring 108 which urges said valve toward a seat rib 109. On the opposite side the valve 106 is provided with a stem 110 which projects through the end of the casing a suitable distance.

The valve device 104 may comprise a casing having a chamber 111 connected to the pipe 107 and containing a valve 112 for controlling communication from the chamber 111 to an atmospheric vent port 113. On one side the valve 112 is subject to the pressure of an expansible coil spring 114 which urges said valve toward a seat rib 115. On the opposite side the valve 112 is provided with a stem 116 which projects through the end of the casing a suitable distance.

The valves 106 and 112 are adapted to be operated by an inertia device, and therefore the valve stems 110 and 116 should be oppositely disposed in axial alinement with a suitable space between the extremities thereof.

The inertia device may comprise a weight 125 having a supporting rod 126 pivotally mounted on a portion 127 of the vehicle framing by means of a pin 128.

Above the pivot pin 128, the rod 126 is provided with oppositely extending arms 129, upon which rests the base of a plunger 130.

The plunger 130 is provided with an adjustable head 131 adapted to engage the short arm 132 of a lever 133 pivotally mounted on the vehicle framing by means of a pin 134.

The long arm of the lever 134 extends between the ends of the valve stems 110 and 116 and is normally held in engagement with the valve stem 110 by a spring 135, so that the valve 106 is maintained unseated.

In operation, when the brake valve device 1, at the left of the drawings, Fig. 2, is operated in the manner above described, fluid under pressure is supplied from the main reservoir pipe 48 to pipe 34 and from thence to chamber 105, of the valve device 103.

Since the valve 106 is held unseated by the lever 133, fluid under pressure flows past the open valve 106 to pipe 107, and to the brake cylinder 2, so as to effect an application of the brakes.

In as much as chamber 111 of the valve device 104 is connected to the pipe 107, and since the valve 112 is normally maintained seated by the spring 114, when fluid under pressure is supplied to the brake cylinder 2 to effect an application of the brakes, chamber 111 will also be supplied with fluid under pressure.

If the rate of deceleration of the vehicle, due to the brakes having been applied exceeds the desired maximum rate, the adjustment and proportioning of the parts is such that the weight 125 will be moved in the direction of travel of the vehicle by its inertia, so as to cause one or the other of its arms 129 to lift the plunger 130 and cause the head 131 thereof to engage the short arm 132 of the lever 133.

The long arm of the lever 133 will thus be tilted downwardly away from the end of the valve stem 110, permitting the spring 108 to seat the valve 106. Further flow of fluid to the brake cylinder will thus be cut off.

If the rate of deceleration increases, the weight 125 will swing further, operating the lever 133, so that the long arm thereof engages the stem 116 and effects the opening of the valve 112.

Fluid under pressure is then vented from the brake cylinder 2 by way of the atmospheric exhaust port 113 and the pressure with which the brake shoes are applied to the wheels is relieved until the rate of deceleration is reduced so as to permit the weight 125 to return to its normal position, in which the lever 133 will be lifted from the valve stem 116, thereby permitting the valve 112 to be seated by the spring 114. The further release of fluid from the brake cylinder 2 is then cut off.

The function and operation of the remaining portions of the equipment are the same in the form of the invention shown in Fig. 2 as has been previously described in connection with Fig. 1 and therefore a further explanation thereof is not deemed necessary.

While two illustrative embodiments of the invention have been described in detail, it is not my intention to limit their scope to these embodiments or otherwise than by the terms of the appended claim.

Having now described my invention, what I claim as new and desire to secure by Letters Patent, is:

In a vehicle brake apparatus, the combination with a brake cylinder and means for controlling the supply of fluid under pressure to the brake cylinder to effect an application of the brakes, of a valve for controlling communication through which fluid under pressure is supplied to the brake cylinder, a second valve for venting fluid from the brake cylinder, both of said valves having operating stems, said stems being oppositely disposed in axial alinement, a lever having an arm extending between the valve stems, means for normally maintaining the lever arm in engagement with the stem of the first valve whereby said valve is held open, and an inertia controlled device operated upon an increase in the rate of deceleration of the vehicle for operating the lever to close said first valve and then said second valve, so as to vent fluid under pressure from the brake cylinder.

In testimony whereof I have hereunto set my hand, this 5th day of September, 1930.

SAMUEL L. WILLIAMS.